United States Patent [19]
Park

[11] Patent Number: 5,663,853
[45] Date of Patent: Sep. 2, 1997

[54] HEAD SLIDER ASSEMBLY HAVING FIRST AND SECOND LEADING EDGE TAPERED PORTIONS FORMED ON LOWER AND UPPER SURFACES OF AN AIR INFLOW EDGE

[75] Inventor: Ki-Ook Park, Seoul, Rep. of Korea

[73] Assignee: SamSung Electronics Co, Ltd., Suwon, Rep. of Korea

[21] Appl. No.: 489,513

[22] Filed: Jun. 12, 1995

[30] Foreign Application Priority Data

Jul. 7, 1994 [KR] Rep. of Korea .......... 16322/1994

[51] Int. Cl.$^6$ .......... G11B 5/60; G11B 15/64; G11B 17/32; G11B 21/20
[52] U.S. Cl. .......... 360/103; 360/104; 360/102
[58] Field of Search .......... 360/102, 103, 360/104

[56] References Cited

U.S. PATENT DOCUMENTS

| | | | |
|---|---|---|---|
| 4,214,287 | 7/1980 | Stromsta et al. | 360/103 |
| 4,327,387 | 4/1982 | Plotto | 360/103 |
| 4,330,804 | 5/1982 | DeMoss | 360/103 |
| 4,420,780 | 12/1983 | Deckert | 360/103 |
| 4,605,977 | 8/1986 | Matthews | 360/103 |
| 4,644,641 | 2/1987 | Verdone | 360/103 |
| 4,734,803 | 3/1988 | Nishihira | 360/103 |
| 4,802,042 | 1/1989 | Strom | 360/103 |
| 4,893,204 | 1/1990 | Yamada et al. | 360/103 |
| 4,894,740 | 1/1990 | Chhabra et al. | 360/103 |
| 4,901,185 | 2/1990 | Kubo et al. | 360/103 |
| 4,961,121 | 10/1990 | Astheimer et al. | 360/103 |
| 5,012,369 | 4/1991 | Owe et al. | 360/104 |
| 5,019,930 | 5/1991 | Takeya | 360/103 |
| 5,198,934 | 3/1993 | Kubo et al. | 360/103 |
| 5,276,573 | 1/1994 | Harada et al. | 360/103 |
| 5,299,079 | 3/1994 | Kuroda | 360/103 |
| 5,299,080 | 3/1994 | Mizuno et al. | 360/103 |
| 5,353,181 | 10/1994 | Frater et al. | 360/104 |
| 5,383,073 | 1/1995 | Masukawa et al. | 360/103 |

FOREIGN PATENT DOCUMENTS

| | | |
|---|---|---|
| 61-260484(A) | 11/1986 | Japan . |
| 2-78077(A) | 3/1990 | Japan . |
| 2-240886 | 9/1990 | Japan . |
| 5-2793(A) | 1/1993 | Japan . |

*Primary Examiner*—Robert S. Tupper
*Assistant Examiner*—Adriana Giordana
*Attorney, Agent, or Firm*—Robert E. Bushnell, Esq.

[57] ABSTRACT

A novel head slider assembly for a hard disk drive includes a transducer and an air bearing slider supporting the transducer; a head suspension mechanism for supporting the air beating slider with the transducer closely adjacent to the recording surface of a recording medium in an orientation having a predetermined pitch angle and a predetermined spacing with respect the recording surface of the recording medium, and for moving the air bearing slider relative to the recording surface of the recording medium; and the air bearing slider having leading and trailing edges, an upper surface and a lower surface extending from the leading edge to the trailing end of the air bearing slider, a first tapered portion at the leading edge in the lower surface and a second tapered potion at the leading edge in the upper surface for enabling the air beating slider to stably maintain in a low flying height with respect to the recording surface of the recording medium.

19 Claims, 5 Drawing Sheets

$\theta_1 < \theta_2 \leq 75°$ t0 < t1 < t2 < t3

HEAD SLIDER ASSEMBLY HAVING FIRST AND SECOND LEADING EDGE TAPERED PORTIONS FORMED ON LOWER AND UPPER SURFACES OF AN AIR INFLOW EDGE

CROSS-REFERENCE TO RELATED APPLICATIONS

This application makes references to, incorporates the same herein, and claims all benefits incurring under 35 USC §119 from an application for Head Slider Assembly Having First and Second Leading Edge Tapered Portions Formed On Lower And Upper Surfaces Of An Air Inflow Edge on 7 Jul. 1994 and assigned Ser. No. 16322/1994.

BACKGROUND OF THE INVENTION

Technical Field

The present invention relates to a recording head slider assembly used in a hard disk drive, and more particularly to an improved magnetic head slider assembly connected to an actuator of the HDD via a gimbal comprising a first leading edge tapered portion formed on a lower surface, and a second leading edge tapered portion formed on an upper surface where a flow of air is generated when the magnetic disk is rotated so as to provide stability and maintain a low flying height between the recording head and the rotating magnetic disk.

Background Art

In a hard disk drive (hereinafter "HDD"), a magnetic head is formed integrally with a slider which is flexibly supported by a head suspension mechanism and is adapted to be held apart from a rotating magnetic disk by a suitable distance so that the magnetic head could record and reproduce (write and read) information on and from the magnetic disk while the magnetic head maintains a suitable flying height or air bearing clearance or gap with respect to the disk surface. The hard disk drive is widely used as a storage device for a computer because of its high density, short access time and considerably high rate of transfer of information. To further improve the recording density of a magnetic disk used in the HDD, there are growing requirements for reducing a flying height between the head slider and the magnetic disk surface, and increasing the stability of maintaining the flying height at a constant level. Low flying height or small gap between the head slider and the magnetic disk surface in the order of a few tens of micros (micrometers) or less is desirable because it allows short wave-length and high-frequency signals to be recorded, and thereby enabling high density and high storage capacity recording. Maintaining a constant flying height over the magnetic disk is also desirable because it allows the average fly height from inner to outer radius of the rotating magnetic disk to be reduced, thereby obtaining higher storage density without reducing reliability. Consequently, there have been many attempts in the prior art to satisfy these requirements, but most fail to stably maintain the flying height between the head slider and the magnetic disk surface at the lowest level without damaging both the head slider and information stored in the magnetic disk.

An example of a conventional magnetic head slider are disclosed in U.S. Pat. No. 5,276,573 for Slider Unit Controllably Actuated At A Surface Of A Moving Information Recording Medium issued to Harada et al., U.S. Pat. No. 5,019,930 for Negative-Pressure Type Magnetic Head Slider, And Method Of Producing The Same issued to Takeya, and U.S. Pat. No. 4,802,042 for Side-Vented Magnetic Head Air Bearing Slider issued to Strom, which includes a pair of parallel spaced-apart air-bearing rails extending from a leading edge to a trailing edge of the slider, a cross rail extending between the air-bearing rails to reduce an mount of air flow, a pressure-reducing portion, and a leading edge tapered portion disposed at an air inflow edge of each rail for effectively introducing an air stream caused by the rotation of the magnetic disk and enabling the pressure-reducing portion to maintain a stable flying height between the trailing edge of the head slider and the magnetic disk surface. Other variation is disclosed in U.S. Pat. No. 4,420,780 for Self-Loading Magnetic Head Air Bearing Slideregative-Pressure Type Magnetic Head Slider issued to Deckert which further characterizes that the surface of the air-bearing rails having a cylindrical or parabolic crowned shape so that minimum spacing between the slider and the magnetic disk occurs at the trailing end.

Alternative slider configurations are set forth in U.S. Pat. No. 5,383,073 for Magnetic Head Supporting Apparatus Having A Fulcrum Point Of )Load Support Offset From A Slider Center In An Air Upstream Direction issued to Masukawa et al., U.S. Pat. No. 5,299,080 for Floating Head Slider With Improved Suspension For Use In Magnetic/Optical Disk Recording Apparatuses issued to Mizuno et al. U.S. Pat. No. 5,299,079 for Flying Head Slider With Control Grooves To Establish A Uniform Flying Height issued to Kuroda, U.S. Pat. No. 5,198,934 for Magnetic Disk Device Including A Slider Provided With A Solid Protecting Layer Which Determines The Distance Between A Magnetic Gap And A Magnetic Disk Recording Device and U.S. Pat. No. 4,901,185 for Magnetic Disk Device Used With A Rigid Magnetic Disk Providing A Constant Distance Between The Magnetic Disk And A Magnetic Gap Of The Magnetic Head Device both issued to Kubo et al., U.S. Pat. No. 4,961,121 for Air Bearing Slider Rail Design With Trumpet-Shaped Rail Portion issued to Astheimer et at., U.S. Pat. No. 4,894,740 for Magnetic Head Air Bearing Slider issued to Chhabra et al., U.S. Pat. No. 4,893,204 for Air Bearing Head Slider Having First And Second Leading Edge Tapered Portions issued to Yamada et al., U.S. Pat. No. 4,734,803 for Magnetic Head Air Bearing Slider issued to Nishihira, U.S. Pat. No. 4,605,977 for Air Bearing Head Displacement Sensor and Positioner issued to Mathews, and U.S. Pat. No. 4,327,387 for Magnetic Head Slider Assembly Comprising At Least One Transducer For Reading And/Or Recording Information Contained On A Data Carrier issued to Plotto.

For example, Kuroda '079 teaches a slider configuration having a pair of parallel air-bearing rails spaced-apart from each other by a slider groove, an adjacent pair of control grooves higher than the slider groove disposed on one side of the rails, respectively, and a leading edge tapered portion disposed at air inflow edge of each rail and control groove. Plotto '387 and Mathews '977 disclose a slider configuration having a simple pair of parallel air-bearing rails. Astheimer '121 teaches a slider configuration having a pair of parallel air-bearing rails each with a leading edge tapered potion and an air-bearing surface that has its greatest width at the leading edge of the slider but becomes progressively narrower toward the trailing edge of the slider. Masukawa '073 and Nishihira '803, on the other hand, disclose a pair of parallel air-bearing rails that become progressively narrower toward the trailing edge of the slider. Chhabra 740, Yamada '204 and Kubo '185 and '934 describe a slider configuration that has a pair of parallel air-bearing side rails and one center rail. All these sliders have a shape which generates an air flow between the slider and the magnetic disk.

When the magnetic disk is rotating at a rotation speed such as, for example 3600 rpm, the head slider flexibly supported by the head suspension mechanism, is subjected to an aerodynamic lift force caused by the air flow generated by the rotation of the magnetic disk, and floats over the surface of the magnetic disk. Generally, the flying height of the head slider is determined by the balancing between the aerodynamic lift force and a resilient force or static load provided by a load beam of the head suspension mechanism when the magnetic disk is at rest. Further detail is disclosed in U.S. Pat. No. 5,012,369 for Head Suspension Mechanism Of A Recording Apparatus With A Constant Flying Height issued to Owe et al. The conventional slider configurations as set forth above, are designed to utilize the aerodynamic lift force and stably maintain a substantial constant flying height over the magnetic disk surface. Some slider configurations such as Yamada '204 are even capable of maintaining a stable flying height over the magnetic disk surface even when the rotation speed of the magnetic disk is relatively low.

Generally, although these conventional slider configurations are capable of providing stability in maintaining the constant flying height over the magnetic disk surface, they are relatively complex and have some difficulty in maintaining the flying height at the lowest possible level in order to maximize the recording density of a magnetic disk.

SUMMARY OF THE INVENTION

It is therefore an object of the present invention to provide a novel construction of an air bearing slider assembly that can be mass produced relatively easily while maintaining the lowest possible flying height over the surface of a disk.

It is also an object of the present invention to provide a novel head slider assembly with a combined pressure profile that enables the slider to fly with the leading edge at a desired pitch angle with respect to a rotating disk with a minimum flying height between the slider and the disk surface at the trailing edge where the magnetic transducer is mounted.

It is further an object of the present invention to provide a magnetic head slider having a novel but simple shape that best utilizes the aerodynamic lift force at the leading edge to fly over the disk surface in the earliest possible time once the disk starts to rotate so that the contact start time of the magnetic head could be minimized.

In accordance with the present invention, a novel head slider assembly includes a transducer and an air bearing slider supporting the transducer; a head suspension mechanism for supporting the air bearing slider with the transducer closely adjacent to the recording surface of a recording medium in an orientation having a predetermined pitch angle and a predetermined spacing with respect to the recording surface of the recording medium, and for moving the air bearing slider relative to the recording surface of the recording medium; and the air bearing slider having leading and trailing edges, an upper surface and a lower surface extending from the leading edge to the trailing end of the air bearing slider, a first tapered portion at the leading edge of the lower surface and a second tapered portion at the leading edge of the upper surface for enabling the air bearing slider to stably maintain in a low flying height with respect to the recording surface of the recording medium.

To further achieve the above objectives, the first tapered portion at the leading edge of the slider in the lower surface is inclined at a first predetermined angle $\theta_1$ with respect to the flat portion of the lower surface of the slider, and the second tapered portion at the leading edge of the slider in the upper surface is inclined at a second predetermined angle $\theta_2$ with respect to the flat portion of the upper surface of the slider. According to the present invention, the first predetermined angle $\theta_1$ could be any angle not more than 75°, and the second predetermined angle $\theta_2$ should be less than the first predetermined angle $\theta_1$ so as to counteract the aerodynamic lift force generated by the rotation of the recording medium when air flows through the first predetermined angle $\theta_1$ and maintain the flying height between the slider and the disk surface at a stable and lowest possible level. The slider body has a width of approximately 2-3 mm, a length of approximately 2.5-4 mm and a thickness of approximately 0.5-0.8 mm. The desired length of both the first and second tapered portions at the leading edge of the slider should preferably be in the range of 5-40% of the total length of the slider body. Moreover, the use of the first and second leading edge tapered portions is applicable to all slider configurations known in the art.

The present invention is more specifically described in the following paragraphs by reference to the drawings attached only by way of example.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
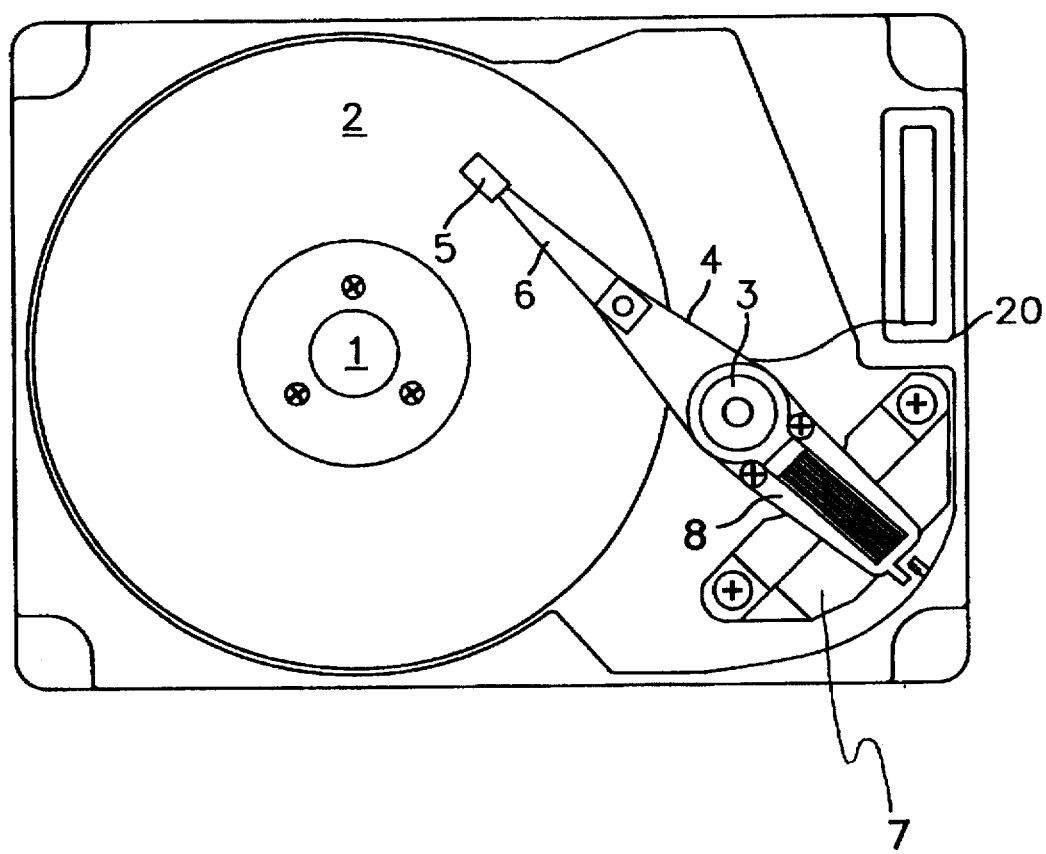
FIG. 1 illustrates a conventional hard disk drive.

Referring now to the drawings and particularly to FIG. 1, the hard disk drive (HDD) includes a housing comprised of a base body 20 and a cover (not shown) and a disk 2 which rotates at high speed by a spindle motor 1 and an actuator 4 with a magnetic head slider assembly 5 for writing and reading data recorded in the disk 2. Both base body 20 and cover are fabricated from aluminum or other material that conducts heat rapidly and acts as a heat sink.

The actuator 4 is secured on a base body 20 and is installed to rotate around a pivot 3. As a bobbin 8 installed at one end portion of the actuator 4 moves by the operation of a voice coil motor 7, the magnetic head slider assembly 5 installed at the other portion of the actuator 4 via a load beam 6 moves through the surface of the disk 2, thereby enabling writing and reading data on individual tracks of the disk 2. As the magnetic head slider assembly 5 moves through the surface of the disk 2, it also maintains a minute interval from the disk 2 because the magnetic head slider assembly 5 is separated from the surface of the disk 2 by an air gap or flying height as the disk 2 rotates at high speed. Upon completion of operation of the hard disk drive or when the power is turned-off, the actuator 4 is positioned on a parking zone located adjacent to an innermost track of the disk 2 so as to prevent data perviously recorded on the disk 2 from being damaged by the inadvertent contact of the magnetic head with the disk surface.

Figure 2:
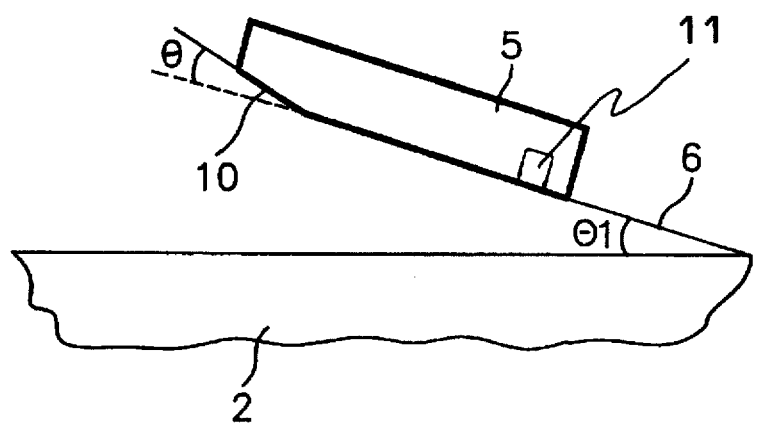
FIG. 2 illustrates a side view of a conventional slider assembly 5 with a magnetic transducer 11.
Figure 3:
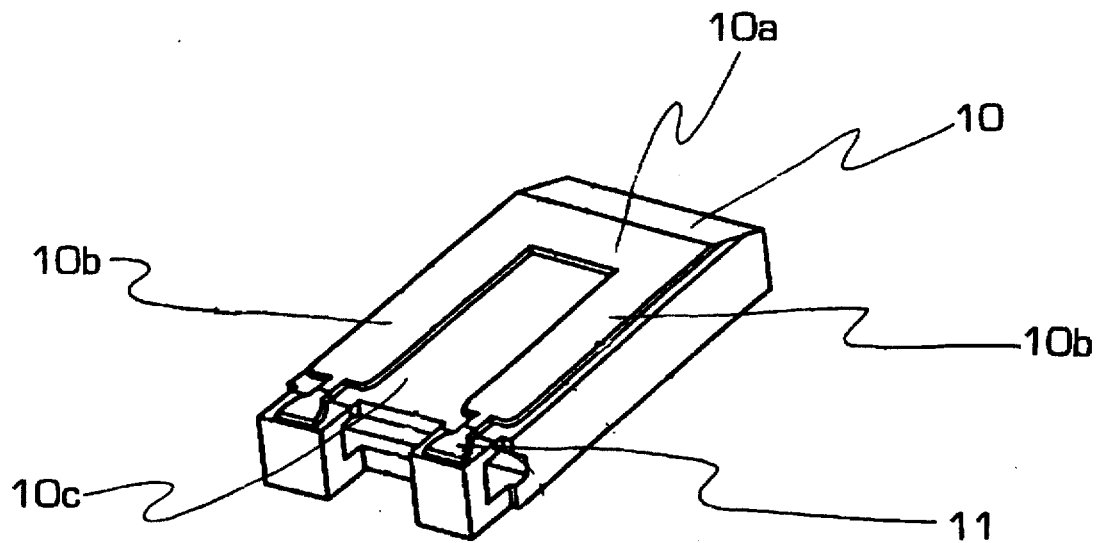
FIG. 3 illustrates a plan view of a conventional slider assembly 5 with a magnetic transducer 11.

FIG. 2 illustrates a side view of a conventional head slider assembly 5 having leading and trailing edges and a transducer 11 (magnetic or optical) attached at the trailing edge and spaced-apart from the disk surface 2 by a transducing gap or a flying height at a certain pitch angle $\theta$ defined by a tapered portion 10 at the leading edge positioned at an incline angle $\theta_1$ with respect to the flat lower surface 10a of the slider. The specific configuration of the conventional head slider assembly 5 is shown in FIG. 3 to include a pair of parallel spaced-apart air-bearing rails 10b extending from a leading edge to a trailing edge of the slider with a pair of transducers 11 attached thereon, a cross rail 10a extending between the air-bearing rails 10b at the leading edge of the slider, a pressure-reducing or sucking portion 10c, and a leading edge tapered portion 10 disposed at an air inflow edge for effectively introducing air flow caused by rotation of the disk 2 and enabling the pressure-reducing portion 10c to maintain a stable flying height between the trailing edge of the head slider 5 and the disk surface 2.

Under the formation as shown in FIG. 2, the head slider assembly 5 is in contact with the surface of disk 2 in case that the hard disk drive does not operate. When the HDD operates however, the disk 2 rotates quickly at a rotation speed such as 3600 rpm, the head slider assembly 5 is subject to an aerodynamic lift force caused by the air flow generated by the rotation of the disk, and it floats over the surface of the disk at a certain pitch angle $\theta$. Ordinarily, the head slider assembly 5 slowly rises over the surface of the disk 2 as the lift force is slowly developed. The tapered inclination angle $\theta$ formed at the lower surface of the leading edge of the slider assembly 5 dictates the rise time of the head slider 5. That is, the greater the tapered inclination angle $\theta$ formed at the lower surface of the leading edge of the head slider 5, the quicker the head slider 5 will rise over the surface of disk 2 at the greater pitch angle $\theta1$.

It is desirable to increase the rise time of the head slider 5 over the surface of the disk 2, but not at the expense of maintaining a low flying height between the head slider 5 and the disk surface 2. In the conventional art, it is difficult to obtain both features.

Figure 4:
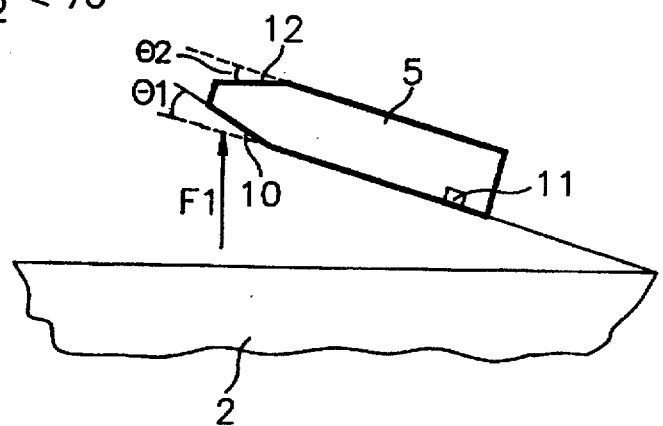
FIG. 4 illustrates a side view of a novel slider assembly 5 according to the present invention.

Turning now to FIG. 4 which illustrates a plan view of a novel head slider assembly 5 with a transducer according to the present invention. In order to increase the rise time of the head slider 5 over the surface of the disk 2, and at the same time maintaining the flying height between the head slider 5 and the disk surface 2 at a low level, the novel head slider 5 as contemplated by the present invention is configured to include a first tapered portion 10 at a leading edge in a lower surface and a second tapered portion 12 at the leading edge in an upper surface of the slider for enabling the slider to stably maintain in a low flying height with respect to the recording surface of a recording medium. The first tapered portion 10 at the leading edge of the slider in the lower surface is inclined at an angle $\theta_1$ no more than 75° with respect to the flat portion in the lower surface of the slider, and the second tapered portion 12 at the leading edge of the slider in the upper surface is inclined at an angle $\theta_2$ less than angle $\theta_1$ of the first tapered portion with respect to the flat portion in the upper surface of the slider so as to counteract the aerodynamic lift force generated by rotation of the disk 2 when air flows through the first tapered portion 10 of the slider and lifts the slider above the surface of the disk 2. While the inclination angle $\theta_1$ of the first tapered portion helps to quickly lift the slider 5 over the surface of the disk 2 when the disk 2 starts to rotate, the inclination angle $\theta_2$ of the second tapered portion provides a counteract force so as to advantageously maintain the slider 5 at a stable and minimum flying height above the disk surface 2 so as to increase the packing density of data on the disk 5. Although the head slider 5 as contemplated by the present invention has a width of approximately 2–3 mm, a length of approximately 2.5–4 mm and a thickness of approximately 0.5–0.8 mm, any slider configuration known in the art would suffice as long as the slider is tapered with the first and second symmetrical tapered portions at the leading edge in the lower and upper surfaces of the slider. Further, the desired length of both the first and second tapered portions at the leading edge of the slider should preferably be in the range of 5–40% of the total length of the slider body.

Under the formation shown in FIG. 4, data is read and written on the surface of the disk 2 through the gap of the head slider 5. Electrical signal is applied to the head slider 5 and data is written on the surface of disk 2 or read from the surface of disk 2. When the disk 2 begins to rotate, the head slider 5 begins to position at the outermost position of disk 2 and the surrounding air also rotates along with the disk 2. As the rotation increases, air flows in a gap between the slider 5 and the disk 2 through the first tapered portion 10 at the leading edge in the lower surface of the slider 5 to lift the slider 5 over the disk surface. Gradually, the air flow increases as time goes on, and after a short time period, becomes stable at a certain flying height above the disk surface.

Figure 5:
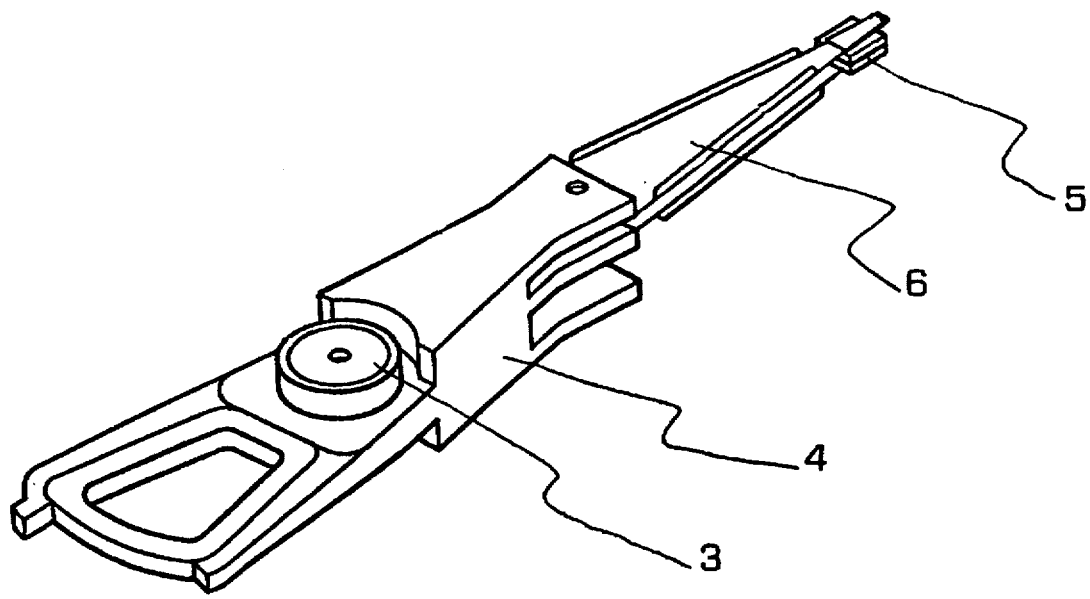
FIG. 5 illustrates a head suspension mechanism with a novel slider assembly 5 according to the present invention.

FIG. 5 illustrates a head suspension mechanism according to the present invention including a pivot 3, an actuator 4, a load beam 6 and a novel head slider assembly 5 connected to the load beam 6 via a gimbal (not shown). Actuator 4 rotates about a pivot 3 to access disk 2 by controlling electrical current provided to a voice coil motor 7. Head slider assembly 5 has a transducer (not shown) made of high magnetic permeability material for performing the recording with its magnetic flux and reproduction of information to or from the disk 2, and is held by the load beam 6 made of a metal, such as a stainless steel sheet. Load beam 6 has a rigid section for suspending the head slider 5 via the gimbal and a resilient section for permitting movement of the head slider 6 in a direction perpendicular to the disk. Once actuator 4 is rotated to a desired position on disk 2, the slider assembly 5 having a transducer mounted thereon is able to write and read data on and from the disk.

Figure 6:
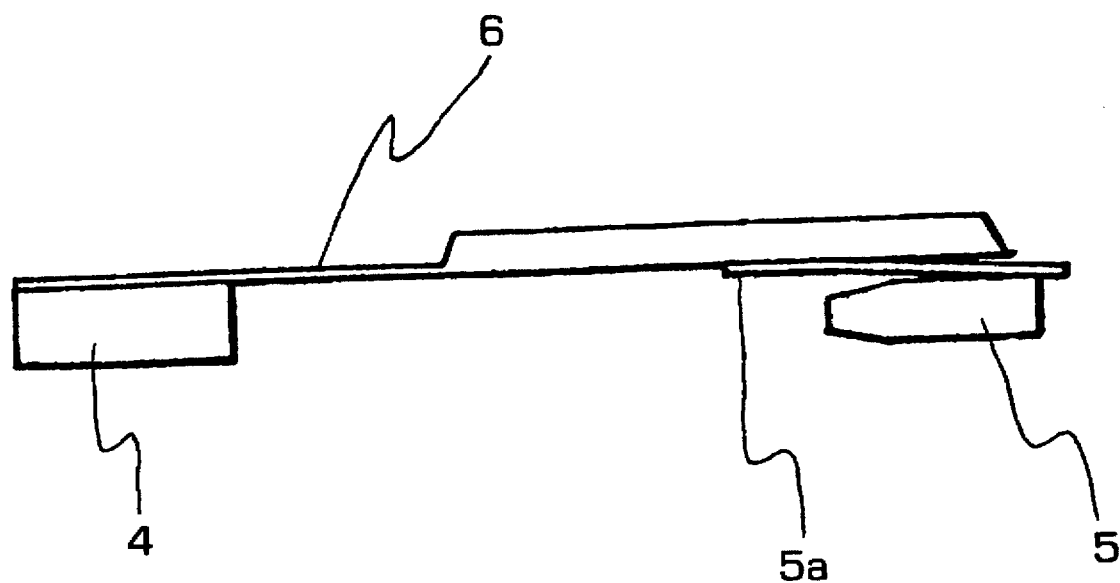
FIG. 6 illustrates a side view of the novel slider assembly 5 connected to a load beam of the head suspension mechanism.

FIG. 6 further illustrates a side view of the head suspension mechanism according to the present invention including the load beam 6 and the novel head slider assembly 5 and the gimbal 5a. The head slider 5 having a first tapered portion 10 at a leading edge in a lower surface and a second tapered portion 12 at the leading edge in an upper surface of the slider as shown in FIG. 4 is connected to the tip of the load beam 6 by the gimbal 5a made of resilient material. Gimbal 5a is disposed to hold the head slider 5 flexibly so as to provide free angular movement of the slider in relation to the load beam 6 with respect to a rotation axis in a direction tangential to circular track of the disk 2.

Figure 7A:
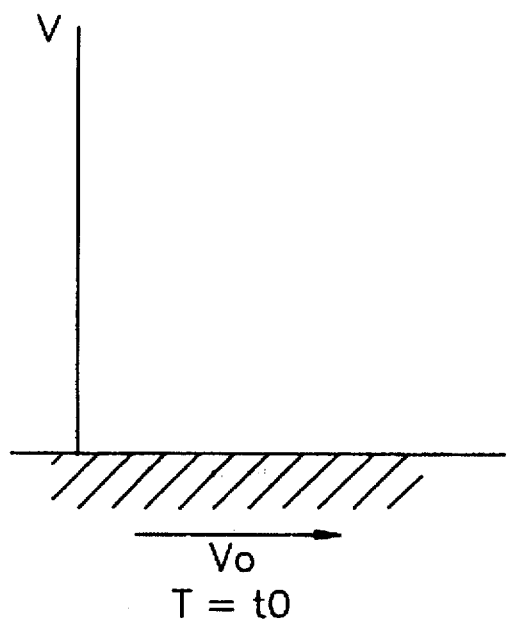
FIGS. 7A through 7D illustrates air flow characteristics according to rotation speed of a disk 2 in which the novel slider assembly 5 according to the present invention is placed over the disk surface 2.
Figure 7B:
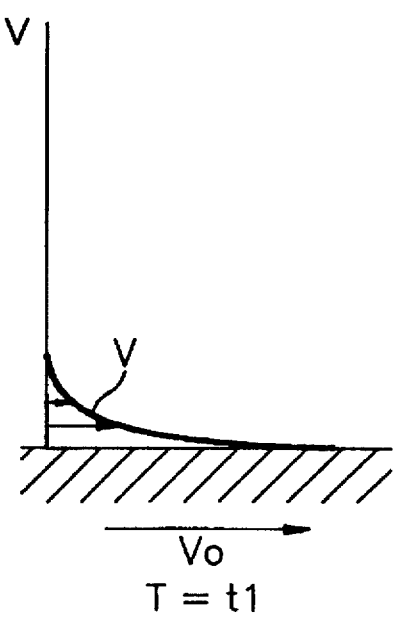
Figure 7C:
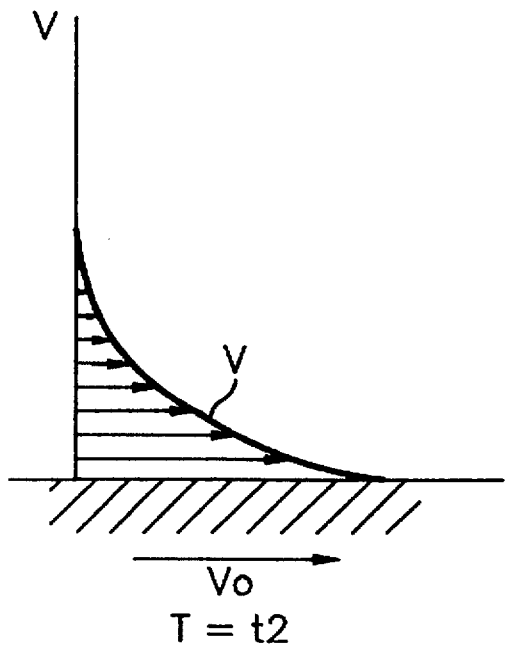
Figure 7D:
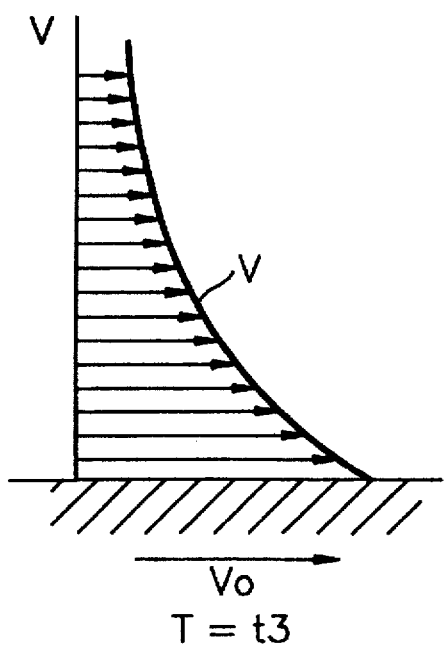

FIGS. 7A through 7D illustrates air flow characteristics according to rotation speed of a disk 2 in which the novel slider assembly according to the present invention is placed over the disk surface 2. Air grain adherent to the disk surface 2 moves in the same direction of rotation as the velocity of disk 2 as shown by an arrow mark Vo. The farther the air grain from the surface of the disk 2, the less the velocity of air current is reduced. For example, FIG. 7A shows no air flow or air current Vo at time T=to when the disk 2 does not rotate. As the velocity of air current Vo gradually increases as shown in FIG. 7B and FIG. 7C, then eventually increases to full velocity at T=t3 as shown in FIG. 7D, the air rotating along the rotating disk 2 is now at high speed, and flows through the inclination angle $\theta_1$ formed by the first tapered portion in the leading edge of the head slider 5 and then lifts the head slider 5 above the surface of the disk 2. That is, the head slider 5 can fly above the disk surface by surmounting the weight and load of the head slider 5 by an aerodynamic lift force caused by rotation of the disk 2. Such a buoyancy enables the head slider 5 to fly quickly above the disk surface 2 according to a size of the inclination angle $\theta_1$.

Since the head slider 5 rises quickly above the disk surface by the aerodynamic lift force caused by air flow generated by rotation of the disk 2, resistivity of such air flow by the second tapered portion 12 at the leading edge in an upper surface of the head slider 5 is desirable so as to stabilize the flying height and to maintain the flying height at a low level. As described earlier, the second tapered portion 12 is oblique from an upper surface of said head slider at an angle $\theta_2$ much less than the angle $\theta_1$ of the first tapered portion 10 as shown in FIG. 4 so as to provide a counteract force to the aerodynamic lift force generated by rotation of said recording medium in order to stabilize the flying height at a low level.

As discussed above, the present invention contemplates on forming two symmetrical inclination angles at the leading edge in the upper and lower surface of the head slider 5 so as to advantageously stabilize the flying height between the head slider 5 above the disk surface 2 at a low level. Consequently, when the HDD operates in the contact state of the disk 2 and the head slider 5, the novel head slider 5 of the present invention can rise at an earlier time without sliding on the disk surface and can stably fly in the low flying height. Generally, the present invention has an advantage in improving the performance of a recording head.

While preferred embodiments of the invention have been particularly shown and described, it will be understood by those skilled in the art that foregoing and other changes in form and details may be made without departing from the spirit and scope of the invention as defined in the appended claims, and that it may be possible, for example, to define the first and second tapered portions at the symmetrical upper and lower surfaces of the leading edge of the slider with virtually each and every possible slider configurations known in the prior art. Furthermore, the principles of the invention are also directly applicable to optical disk drive.

What is claimed is:

1. A disk recording system, comprising:
   a recording medium having a recording surface;
   a transducer and a head slider for supporting said transducer;
   means for supporting said head slider with said traducer closely adjacent to the recording surface of said recording medium in an orientation having a predetermined pitch angle and a predetermined spacing with respect to the recording surface of said recording medium, and for moving said head slider relative to the recording surface of said recording medium; and
   said head slider having leading and trailing ends, an upper surface and a lower air bearing surface opposite of said upper surface and extending from the leading end to the trailing end of said head slider, a first tapered portion at said leading end integrally formed therein and tapered from said lower air bearing surface toward said leading end at a first predetermined angle greater than zero and not more than seventy-five degrees and oblique with respect to said lower air bearing surface of said head slider, and a second tapered portion at said leading end integrally formed therein and tapered from said upper surface toward said leading end at a second predetermined angle greater than zero and oblique with respect to said upper surface of said head slider for enabling said head slider to stably maintain in a low flying height with respect to the recording surface of said recording medium said second tapered portion at said leading end of said upper surface of said head slider being oblique from said upper surface at said second predetermined angle less than said first predetermined angle to counteract an aerodynamic fir force generated by rotation of said recording medium.

2. The disk recording system of claim 1, further comprised of said head slider comprising a width of approximately 2–3 mm, a length of approximately 2.5–4 mm and a thickness of approximately 0.5–0.8 mm.

3. The disk recording system of claim 1, further comprised of said first and second tapered portions at the leading edge of said head slider each having a length in the range of approximately 5–40% of said head slider.

4. The disk recording system of claim 1, further comprised of said means for supporting said head slider with said transducer corresponding to a load beam comprising a rigid section for suspending said head slider and a resilient section for permitting movement of said head slider in a direction perpendicular to said recording medium.

5. The disk recording system of claim 2, further comprised of said first predetermined angle being an angle not more than 75°, and said second predetermined angle being less than said first predetermined angle to counteract the aerodynamic lift force generated when said recording medium rotates and air flows through said first predetermined angle.

6. The disk recording system of claim 5, further comprised of said first and said second tapered portions at the leading edge of said head slider each having a length in the range of approximately 5–40% of a length of said head slider.

7. The disk recording system of claim 6, further comprised of said head slider comprising a width of approximately 2–3 mm, a length of approximately 2.5–4 mm and a thickness of approximately 0.5–0.8 mm.

8. A disk recording system, comprising:
   a recording medium having a recording surface;
   a transducer and a head slider for supporting said transducer in a flying state when said recording medium is rotating;
   a load beam for supporting said head slider with said transducer closely adjacent to the recording surface of said recording medium in an orientation having a predetermined pitch angle and a predetermined spacing with respect to the recording surface of said recording medium, said load beam comprising a rigid section for suspending said head slider via a gimbal and a resilient section for permitting movement of said head slider in a direction perpendicular to said recording medium; and said head slider having leading and trailing ends, an upper surface and a lower air bearing surface opposite of said upper surface and extending from the leading end to the trailing end of said head slider, a first tapered portion at said leading end integrally formed therein and tapered from said lower air bearing surface toward said leading end of said head slider at a first predetermined angle greater than zero and not more than seventy-five degrees, and a second tapered portion at said leading end integrally formed therein and tapered from said upper surface toward said leading end of said head slider at a second predetermined angle greater than zero for enabling said had slider to maintain in a low flying height with respect to the recording surface of said recording medium, said second tapered portion at said leading end of said upper surface being oblique from said upper surface of said head slider at said second predetermined angle less than said first predetermined angle to counteract an aerodynamic lift force generated by rotation of said recording medium.

9. The disk recording system of claim 8, further comprised of said head slider comprising a width of approximately 2-3 mm, a length of approximately 2.5-4 mm and a thickness of approximately 0.5-0.8 mm.

10. The disk recording system of claim 8, further comprised of said first tapered portion at said leading end of said lower air bearing surface of said head slider being oblique with respect to said lower air bearing surface.

11. The disk recording system of claim 8, further comprised of said first and said second tapered portions at the leading edge of said head slider each having a length in the range of approximately 5-40% of a length of said head slider.

12. The disk recording system of claim 11, further comprised of said head slider having a width of approximately 2-3 mm, a length of approximately 2.5-4 mm and a thickness of approximately 0.5-0.8 mm.

13. The disk recording system of claim 12, further comprised of said first and said second tapered portions at the leading edge of said slider body each having a length in the range of approximately 5-40% of a length of said slider body and said slider body comprising a width of approximately 2-3 mm a length of apporoximately 2.5-4 mm and a thickness of approximately 0.5-0.8 mm.

14. The disk recording system of claim 8, further comprised. of said first predetermined angle being an angle not more than 75°, and said second predetermined angle being less than said first predetermined angle to counteract the aerodynamic lift force generated when said recording medium rotates and air flows through said first predetermined angle.

15. A slider for supporting a transducer for operation at a surface of a moving recording medium, comprising:

a slider body having leading and trailing edges, au upper surface and a lower air bearing surface opposite from said upper surface extending from the leading edge to the trailing edge, for flying above said moving recording medium, said lower air bearing surface facing the surface of said moving recording medium, and said leading edge receiving an air inflow as said slider body flies above said moving recording medium when said slider body is positioned adjacent to said moving recording medium in an orientation having a predetermined pitch angle with respect to said moving recording medium in which a minimum spacing between said slider body and said moving recording medium occurs at the trailing edge of said slider body;

a first tapered portion integrally formed at the leading edge and tapered from the lower air bearing surface toward the leading edge of said slider body at a first oblique angle greater than zero and not more than seventy-five degree; and a second tapered portion integrally formed at the leading end and tapered from the upper surface toward the leading edge of said slider body at a second oblique angle greater than zero, for enabling said slider body to stably maintain said minimum spacing with respect to the surface of said moving recording medium said second tapered portion at said leading edge of said upper surface being oblique from said upper surface of said slider body at said second oblique angle less than said first oblique angle to counteract an aerodynamic lift; force generated by rotation of said moving recording medium.

16. The slider of claim 15, further comprised of said first tapered portion at said leading edge of said lower air bearing surface of said slider body being oblique with respect to said lower air bearing surface at said first oblique angle.

17. The slider of claim 15, further comprised of said first and said second tapered portion at the leading edge of said slider body each having a length in the range of approximately 5-40% of a length of said slider body and said slider body comprised a width of approximately 2-3 mm a length of approximately 2.5-4 mm and a thickness approximately 0.5-0.8 mm.

18. The slider of claim 15, further comprised of said slider body comprising a width of approximately 2-3 mm, a length of approximately 2.5-4 mm and a thickness of approximately 0.5-0.8 mm.

19. The slider of claim 15, further comprised of said first and said second tapered portions at the leading edge of said slider body each having a length in the range of approximately 5-40% of a length of said slider body.

* * * * *